Figure 1:
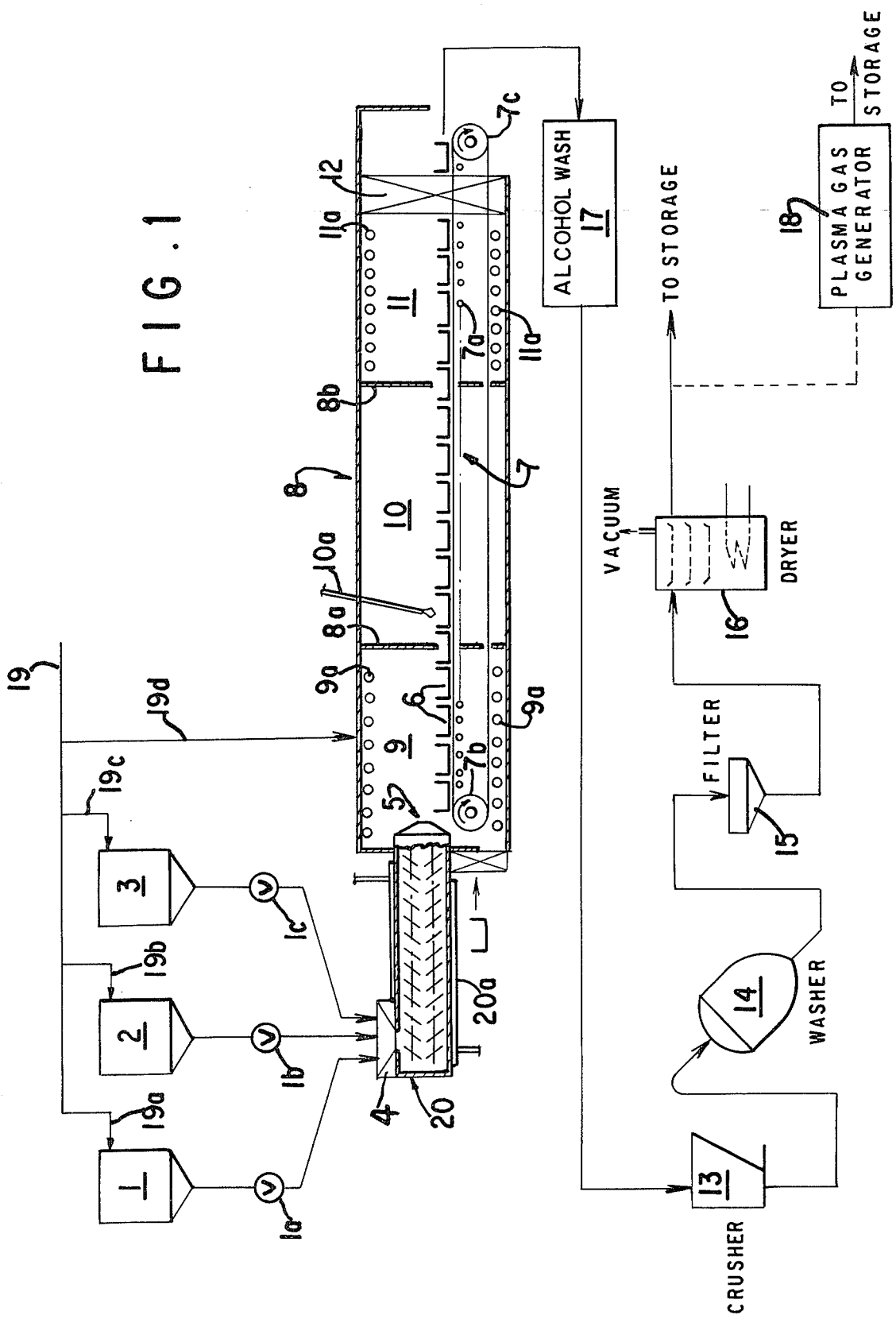

United States Patent [19]

Hähn et al.

[11] 4,231,790
[45] Nov. 4, 1980

[54] PROCESS FOR THE PREPARATION OF TANTALUM AND NIOBIUM POWDERS OF IMPROVED EFFICIENCY

[75] Inventors: Reinhard Hähn, Langelsheim; Dieter Behrens, Goslar, both of Fed. Rep. of Germany

[73] Assignee: Hermann C. Starck Berlin, Berlin, Fed. Rep. of Germany

[21] Appl. No.: 956,898

[22] Filed: Nov. 2, 1978

Related U.S. Application Data

[63] Continuation of Ser. No. 677,038, Apr. 14, 1976, abandoned.

[30] Foreign Application Priority Data

Apr. 18, 1975 [DE] Fed. Rep. of Germany ....... 2517180

[51] Int. Cl.$^3$ .......................... B22F 9/00; C22B 34/24
[52] U.S. Cl. ................................. 75/0.5 BB; 75/84.5; 75/3; 241/23
[58] Field of Search ............. 75/0.5 R, 0.5 AB, 0.5 B, 75/0.5 BB, 3, 84, 84.4, 84.5; 241/23

[56] References Cited

U.S. PATENT DOCUMENTS

| 2,994,603 | 8/1961 | Greenberg et al. | 75/84.5 |
|---|---|---|---|
| 3,012,877 | 12/1961 | Foos et al. | 75/84.4 |
| 3,110,585 | 11/1963 | Scheller et al. | 75/84.5 |
| 3,736,132 | 5/1973 | Morse et al. | 75/84.5 |
| 3,784,369 | 1/1974 | Suanstrom | 75/84.5 |
| 3,976,435 | 8/1974 | Klein | 75/0.5 R |
| 4,009,007 | 2/1977 | Fry | 75/0.5 BB |
| 4,017,302 | 4/1977 | Bates et al. | 75/0.5 BB |

FOREIGN PATENT DOCUMENTS

| 657596 | 2/1963 | Canada | 75/84 |
|---|---|---|---|
| 800311 | 4/1958 | United Kingdom | 75/84.5 |

*Primary Examiner*—L. Dewayne Rutledge
*Assistant Examiner*—Michael L. Lewis
*Attorney, Agent, or Firm*—Hammond & Littell, Weissenberger and Muserlian

[57] ABSTRACT

An anhydrous mixture of extrudable viscosity of an activated alkali metal tantalum or niobium halide powder, an alkali metal halide powder, and a molten alkali metal in about 1:0.75–2.0:4.75–5.5 molar ratio is formed into a paste which is extruded and formed into masses of critical dimensions and temperature. The mass is ignited and a self-sustaining reduction reaction ensues. The reaction product is powdered, washed and dried. The product is pure tantalum or niobium powder in almost quantitative yield. The powder is specially suited for use as electrolytic capacitor anodes. The powder is improved by passage through a plasma of an inert gas. The process can be performed on a continuous scale.

21 Claims, 2 Drawing Figures

PROCESS FOR THE PREPARATION OF TANTALUM AND NIOBIUM POWDERS OF IMPROVED EFFICIENCY

This is a continuation of Ser. No. 677,038, filed Apr. 14, 1976, now abandoned.

FIELD OF THE INVENTION

The present invention relates to a process for the continuous preparation of tantalum (or niobium) metal powder from alkali metal tantalum (or niobium) halide by reduction with an alkali metal, in conjunction with an alkali metal halide. By selecting reaction-determining parameters for the reduction and by the use of an activated alkali metal tantalum (or niobium) fluoride as a reaction partner, tantalum (or niobium) metal powder is obtained which, when processed to electrolytic capacitors, yields hitherto unattained capacitance values per gram.

Tantalum and niobium are both transition metals of atomic number higher than 23 and are metals of column d3 of the Periodic Chart of the elements; see inner front cover of The Merck Index, 8th Ed.

BACKGROUND OF THE INVENTION

There are a number of methods for the preparation of tantalum metal powder by reduction of tantalum halides or halide double salts with alkali metals. All these methods yield tantalum powders that are suitable for certain purposes, for example, for the production of sintered bars for the manufacture of tantalum wire or plates. Several of these methods were developed expressly for the preparation of tantalum metal powder for the manufacture of electrolytic capacitors. Niobium metal powder is produced in similar manner According to German Pat. No. 1,126,144, $K_2TaF_7$ is reduced with sodium in charges in a vacuum or in an atmosphere of a protective gas and, after the usual wet-chemical preparation of the reaction cake, the coarse portion over 150 my and the fine portion under 32 my are separated from the tantalum metal powder. The separated fine portion is heated under high vacuum at 700° to 900° C. to increase the grain size and the portion is added to the main fraction. Tantalum powders prepared this way yield capacitances of 2700 my C/g when processed to capacitor anodes.

U.S. Pat. No. 3,647,415 describes the preparation of a tantalum powder for electrolytic capacitors with a certain grain form of the tantalum crystals. The attainable capacitance of these powders is 4000 my C/g.

U.S. Pat. No. 3,829,310 describes an improved process where a mixture of well-dried potassium tantalum fluoride and an alkali metal halide is coated with liquid sodium up to 300° C. and the resulting mixture (which has a considerably lower temperature and for which a spontaneous ignition temperature of minimum 270° C. is indicated) is ignited in a reaction vessel. After the ignition, the temperature rises to about 1000° C. With additional heating this temperature is maintained for one hour. When the grain fraction of this tantalum powder which is over 5 my but less than 45 my is used for the production of test anodes (sintering temperature 1,600° C.), the anodes have a my C/g value of up to 9,500 with a residual current of about 15 my A/g. The portion of this grain fraction is only up to 32% of the total powder; for this reason this process is uneconomical for the preparation of high capacity tantalum powders.

Other processes for the preparation of tantalum powder, which are not geared specifically to the capacitor quality, comprise substantially simpler steps, and are also listed here.

U.S. Pat. No. 2,950,185 describes a process where liquid $K_2TaF_7$ is reduced under stirring at temperatures above 800° C. to fine-grained tantalum-metal powder by adding liquid sodium. The grain distribution of the tantalum powder obtained is similar to the tantalum of U.S. Pat. No. 3,829,310.

According to U.S. Pat. No. 3,012,877 the reduction is effected continuously in the molten state. The molten state leads preferably to the formation of coarse tantalum particles, which has the result that the powders obtained are only to a limited extent or not at all suitable for the production of high capacity tantalum capacitors.

All presently known methods have the principal disadvantage that both the course of the reduction reaction in larger units and the resulting temperature accumulation and the holding times at high temperatures required to complete the reduction have the effect that it is not possible to obtain tantalum powders which have maximum capacitance values suitable for use as capacitors. It is a further object to avoid these disadvantages.

OBJECTS OF THE INVENTION

It is an object of the invention to provide a process for the production of tantalum and niobium metal powders of fine particle size and high purity in nearly quantitative yields.

It is a further object of the invention to provide such a process which will provide tantalum and niobium powders which possess hitherto unattained capacitance values per gram when employed as capacitors (i.e., as anodes) for electrolytic condensers.

It is a still further object of the invention to provide a means for producing such powders from readily available comparatively inexpensive raw materials.

It is an additional object to provide a continuous method for producing such powders in apparatus of comparatively simple design.

THE INVENTION

The discovery has now been made that the foregoing objects are attained by a process which comprises the steps of heating a powdered alkali metal tantalum or niobium halide at a temperature up to the sintering point of said powder thereby removing any water and hydrogen halide which may be present and decrepitating said powder, mixing said powder with powdered anhydrous alkali metal halide and alkali metal in 1:0.75–2.0:4.75–5.5 molar ratio at a temperature above the melting point of said metal and below the ignition point of said mixture thereby forming a paste of extrudable viscosity, forming said paste into shaped masses, igniting said masses thereby initiating a reduction reaction with formation of a reaction product containing tantalum or niobium metal, allowing said reaction to go to substantial completion, and pulverizing the reaction product and removing alkali halide and alkali metal present; the dimensions of said masses and their temperature at ignition being predetermined so that the maximum temperature reached by said masses during said reaction is less than about 800° C. and is between three and five times the ignition temperature of the paste; said steps being performed in an inert atmosphere or under vacuum while the transition metal is being formed.

We have further found that the process can be performed continuously, with yields of metal in excess of 90% of the theoretical.

We have still further found that the properties of the powder produced by the process are improved when the powder is passed through a plasma of a chemically inert gas.

We have succeeded in producing tantalum anodes having a electrical capacitance in excess of 10,000 my C/g. by sintering tantalum powder produced by the process described above and having a particle size finer than 2.5 my, for half an hour at 1,600° C.

The process of the present invention comprises the following features: (1) Use of pure, highly active alkali transition metal halides. The activation can be achieved by heating the desired alkali metal tantalum or niobium halide to a temperature of preferably 325° to 375° C. in an inert atmosphere, preferably a vacuum; the heating decrepitates the salt and drives off any water and hydrogen halide present.

(2) Preparation of a paste consisting of activated alkali metal tantalum or niobium halide (e.g. potassium tantalum (fluoride), ground alkali metal halide (e.g. KC1), and a molten reducing metal. Any suitable technique can be used. Suitable as alkali metal, in addition to sodium, are potassium and potassium-sodium alloys. Particularly suitable as alkali metal transition metal halides are the sodium and potassium tantalum and niobium chlorides and fluorides (e.g. $Na_2TaF_7$).

(3) Automatic filling of the paste into reaction boats of tantalum metal or into other suitable containers, and cooling of the paste below 50° C. before ignition.

(4) Carrying out the reaction after ignition without external heat supply (in the absence of external application of heat) with subsequent cooling at the end of the reaction to a temperature low enough to permit the product to be treated with a water-soluble alcohol.

(5) Production of tantalum or niobium metal powder from the reaction product.

(6) If necessary, treatment of the tantalum or niobium powder in a plasma of argon or other inert gas. The tantalum or niobium powder obtained according to the invention can be treated by heating in an inert gas atmosphere below the melting point and preferably above 1,000° C. This makes available an additional class of capacitors which are characterized by improved dielectric strength. At the same time the compressibility and fluidity of the metal powder and consequently the filling of the matrix are improved by this after-treatment.

Figure 2:
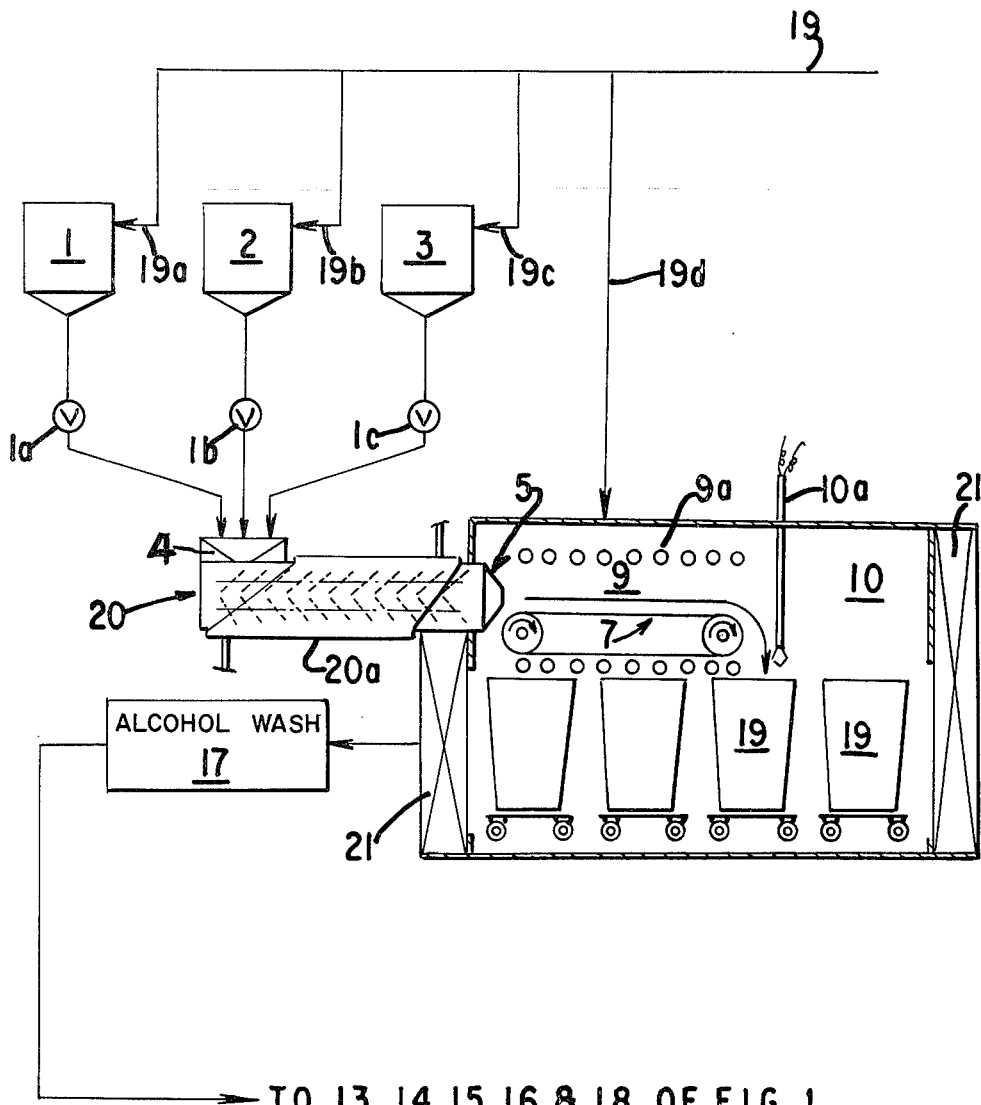

The invention is further illustrated by the drawings, wherein similar components carry the same numbers, and where:

FIG. 1 represents a schematic illustration of one form of apparatus for performing the process on a continuous scale, showing one form of furnace through which the reaction mix is transported in small boats, and FIG. 2 represents a different form of furnace which is suitable for use in the apparatus of FIG. 1.

In FIG. 1, vessels 1, 2 and 3 are provided respectively for the storage of finely divided activated alkali metal tantalum or niobium halide component, for the storage of the finely divided alkali metal halide component, and for the storage of the molten alkali metal component. Alkali metal storage vessel 3 is provided with a hot oil jacket. All three vessels are blanketed with dry inert gas supplied through lines 19 and 19a, 19b and 19c. The vessels discharge by gravity through metering valves 1c, 1d and 1e into air-tight double-screw mixer 20 provided with hot oil jacket 20a for maintaining the paste therein at an extrudable consistency. Mixer 4 discharges into oil jacketed extruder 20, which discharges a homogeneous paste through extrusion head 5 at predetermined rate into boats 6 of refractory material.

Extrusion head 5 extends within furnace 8. The contents of the furnace are in an atmosphere of dry inert gas supplied by pipe 1d in such quantity that the gas is present in furnace 8 under sufficient positive pressure to prevent admission of air. Furnace 8 contains belt conveyor 7 for continuously conveying boats 6 from a position below extrusion head 5 through furnace 8, and then discharging the boats through portal 12 and exit gas lock (not shown).

Belt 7 is supported on rolls 7a and is tensioned between cylinders 7b and 7c, the latter being driven by a variable speed electric motor (not shown); the conveyor system is constructed of refractory inert material.

Furnace 8 is divided into first cooling zone 9 provided with cooling coils 9a adapted to maintain the zone sufficiently cool to cool the contents of the boats below 50° C.; reaction zone 10, where the temperature of the reacting materials reaches about 700°–800° C.; and second cooling zone 11 provided with cooling coils 11a, which cool the reaction product to a temperature where it can be safely treated in the steps which follow.

The boats are charged into 8 through a side gas lock (not shown) adjacent to extrusion head 5, and when they have received their charge of the reaction paste from the extruding head they travel on moving belt 7.

Furnace 8 is provided with dividers 8a and 8b, which retard mixing of the hot gas in combustion zone 10 with the cold or cool gases in end zones 9 and 11.

Furnace 8 is provided with ignitor 10a, consisting of an electrically-heated tantalum or niobium wire adapted to bring one point of the surface of the shaped reaction mass in the boat to reaction temperature and thereby initiate the reaction.

The boats exit from furnace 8 at gate 12 through a gas lock (not shown) and are conveyed under a spray of water-soluble alcohol which converts any unreacted alkali metal present into an alkali metal alcoholate and which also loosens the reaction product in the boats permitting easy removal of the product.

The reaction product is charged into multi-stage crusher 13 where it is ground sufficiently fine to liberate the tantalum or niobium values therein. The resulting powder is charged into washer 14 where it is washed with a suitable solution (typically dilute aqueous hydrohalide solutions containing $H_2O_2$) to remove any unreacted halide which may be present.

The product, now essentially pure tantalum or niobium powder, is conveyed to second washer 15 where it is washed with a volatile water-soluble inert solvent, typically methanol, to remove water, after which the powder is conveyed to dryer 16 where it is dried under vacuum.

Optionally, as shown by the dotted lines, the thus dried powder may be passed through plasma gas generator 18.

In FIG. 2 the masses of reaction paste from extrusion head 5 fall on plate conveyor 7, on which they are transported through cooling zone 9 where they are cooled below 50° C. into reaction zone 10. The cakes fall into large boats 19 admitted through gas lock 21. The first cake to fall is ignited by glowing tantalum (or niobium) wire 10a; the other cakes in the boats become ignited sequentially by contact with the first cake and with each other. The boats are pushed through cooling zone 9 where the reaction products are cooled to a safe temperature, and exit through gas lock 22. Thereafter the process continues in manner shown in FIG. 1.

DESCRIPTION OF THE PROCESS

For the activation, crystalline potassium tantalum (or niobium) fluoride is heated in a furnace under vacuum or under a protective atmosphere in a shallow bed to such an extent that the potassium tantalum fluoride crystals burst into fine potassium tantalum fluoride particles and any moisture or hydrofluoric acid present (and residues of the extracting agent) are evolved. An extremely pure and highly active potassium tantalum fluoride is thereby obtained which has excellent wetting properties (i.e., affinity) for the liquid alkali metals or liquid alkali metal alloys, which are used to form the above-described pastes. The activated (i.e., anhydrous, hydrogen-halide free, decrepitated) potassium tantalum fluoride is cooled and collected in a storage tank under an inert gas, for example argon. A second storage tank 2 under a protective gas contains dried powdered potassium chloride, which is necessary to obtain the proper consistency of the paste. Naturally other alkali halides like sodium halide, sodium fluoride, potassium fluoride, etc. can also be used. A third storage tank 3 contains the alkali metal or an alloy of alkali metals, e.g. a 50—50 by weight mixture of sodium and potassium under a protective gas heated above its melting point. From these three reaction vessels the reagents in proper amounts required for the reaction are metered into the hopper of a jacketed mixer (double screw extruder mixer) and mixed, under vacuum or under a water-free inert atmosphere. The contents of the mixer can be heated by circulation of oil in the jacket as necessary to obtain a mixture of extrudable viscosity. When sodium is used as the reducing agent and potassium tantalum fluoride and potassium chloride are used as the alkali halides, the preferred temperature for the mixing is 120° C. At discharge 5 of the mixer, the paste is automatically charged in portions of proper dimension into tantalum or niobium metal boats 6 (as the case may be) which are arranged on conveyor belt 7 of a continuous furnace 8 having an inert gas atmosphere provided through pipe 19d. The boats carrying the reaction mixture first pass through a cooling zone 9 in which they are cooled to a temperature below 50° C. in order to keep the maximum reaction temperature after ignition as low as possible. Then, still under a protective gas, they move into reaction zone 10, in which they are ignited. Because of the activation of the potassium tantalum fluoride, ignition of the reaction paste in the boat at one point by a glowing tantalum wire suffices to allow the reaction to take its complete course. The layer thickness and volume of the reaction paste in the boats, and the temperature of the reaction paste are predetermined so that the maximum reaction temperature after the ignition is below about 800° C. and is more than three times but less than five times the ignition point of the reaction paste. Preferably the dimensions of the cakes and their temperature on ignition are predetermined so that the reaction temperature is in the range of 700° to 780° C.

In any instance the dimensions of a shaped mass or cake of the reaction mixture of suitable reaction characteristics, as well as the suitable temperature of the cake, can be determined by preliminary test.

The ignition point of the cake is determined by slowly heating the reaction mixture under argon in an aluminum cylinder provided with an observation window and a thermometer and noting the temperature at which a self-sustaining reaction commences. The cake is then ignited in a tantalum (or niobium) dish under an inert gas and the maximum temperature which the cake attains during the reaction is noted. Too high a temperature indicates that the surface area and/or the starting temperature of the cake should be decreased. Both should be varied until the maximum temperature of the reaction is less than 800° C. and is between three and five times the ignition temperature.

After the contents of the boats have been ignited and after the reaction has ended, the boats leave the protective atmosphere furnace and pass through cooling zone 11 in which they are cooled to room temperature. After the boats have been discharged from the furnace through gate 12 they are dipped into alcohol or buffer solution so that the reaction product is separated from the boat and any adhering residue of the reducing metal is reacted. Subsequently the reaction product is reduced to a powder in crusher 13 and the tantalum content of the cake is liberated in known manner from the alkali halide portions by a multi-stage crushing process. The tantalum metal powder thus obtained is filtered off in filter 15, washed with absolute methanol, and dried in dryer 16. The resulting powder is suitable for the production of anodes for electrolytic capacitors.

The tantalum powders described above have bulk densities less than 2 g./cc.

Electrodes particularly useful as anodes can be prepared from the tantalum powder described above, by heating the powders, under pressure if desired at a sufficiently high temperature for a sufficient length of time to provide a product of adequate mechanical strength for its intended use. The sintering temperature of tantalum is about 1,600° C., and suitable durations are in the range of about 10 minutes to 1 hour. In practice, electrodes of very satisfactory mechanical and electrical strength are obtained when the tantalum powder is sintered for half an hour at about 1600° C.

To provide a metal powder which will provide anodes of improved properties (such as are required for certain types of capacitors), the tantalum powder thus obtained is treated with a plasma of a noble gas. The treatment consists in contacting the metal with the plasma at a temperature below the melting point of the metal but above 1,000° C.

The invention is further illustrated by the examples which follow. These examples are preferred embodiments of the invention and are not to be construed in limitation thereof.

EXAMPLE 1

This example can be performed in apparatus according to FIG. 1.

In extruder-double screw mixer 4 were continuously charged per hour the following amounts from storage tanks 1, 2 and 3 (molar ratio 1:1.3:5.09.

40 kg. activated potassium tantalum fluoride (18.47 kg. tantalum content)

10 kg. potassium chloride, less than 1 mm. fineness 12 kg. sodium metal (molten); temperature 105° C.

The amount of sodium metal was 2% above the theoretically required amount. The temperature of the heating jacket around the mixer was 108° C. The extruder opening 5 of the mixer was above the conveyer mechanism of the protective atmosphere furnace whose inlet 9 and end zone 11 were equipped with a cooling system.

Extruder discharge head 5 and protective atmosphere furnace 8 up to discharge gate 12 after second cooling zone 11, were within the protective inert gas (argon) zone with 80 Torr. excess argon pressure.

The boats (350×300×40 mm.) were filled in portions from the extruder mixer with the paste of the reaction mixture up to a height of 30 mm. The weight of the charge per boat was 3±0.2 kg. and the throughput was 20 boats per hour. The mixture which had a temperature of about 102° C. was cooled in the first cooling zone of the furnace to 40° C. When each boat entered thereaction zone, the paste which it carried was ignited by a touch of a glowing tantalum wire 10. The reaction set in immediately, and the temperature in the reaction material rose to 750° C. A preliminary determination of the ignition point of the reaction mixture showed that the paste ignites at 152° C. On completion of the reaction the reaction cake was porous, spongy and friable. During subsequent passage through cooling zone 11 the cake was cooled practically to room temperature. The boats were then discharged from the reaction furnace through gate 12 and were treated with ethanol. This step was performed for safety's sake, to react with any residue of sodium or sodium alloy. The reaction cakes can be easily crushed. The product from 150 boats was crushed to a size below 2 mm. and the resulting powder was collected in wash tower 14 and washed five times with the following solution:

8 liters: 40% aqueous hydrofluoric acid
8 liters: 30% $H_2O_2$
15 cu. m.: deionized water After the washing, the tantalum metal was filtered off, washed with absolute methanol, and dried under vacuum at 150° C. The tantalum metal powder thus obtained weighed 130.5 kg. corresponding to a yield of 97.3% on the amount of $K_2TaF_7$ taken. The reaction was therefore substantially quantitative. The essential data of the tantalum powder obtained are shown in Tables 1 and 2.

EXAMPLE 2

In contrast to Example 1, 310 kg. of a paste of the same composition as in Example 1 were placed into a reaction vessel made of Inconel 600 with a diameter of 400 mm. and a height of 1500 mm. under argon, according to the procedure described in U.S. Pat. No. 3,829,310, and ignited with a glowing tantalum wire. The temperature rose in the interior of the tube to 1080° C. The reaction cake was much more compact than that of Example 1. After crushing and preparation, 84.70 kg. of tantalum metal powder was obtained, corresponding to a yield of 93.1%. The test values of the powder obtained are compiled in Table 1 and 2.

EXAMPLE 3

In this Example the apparatus of FIG. 2 was used.

In extruder-double screw mixer 4 mentioned in Example 1 were mixed a charge of purified and highly activated $K_2TaF_7$, NaCl and Na (liquid) in a molar ratio of 1:0.75:5. The mixture was extruded in portions on argon blanketed plate conveyor 7 and passed subsequently through cooling zone 9 in which it was cooled below 38° C. At the end of the plate conveyor it was stripped off by a stripper and loaded into reaction vessel 6. The first portion was ignited by a glowing tantalum wire. The ignition temperature was 149° C. For the ignition of the following portions the remaining heat of the previously reduced portion sufficed. The charging rate was set at 0.6 kg. of paste per minute, so that the maximum reaction temperature of 745° C. was not exceeded.

After 250 portions has been charged and reacted, the reaction tube was replaced by a new one, and the reduction was carried out continuously. At the same time a new reaction vessel was fed into the protective atmosphere furnace, and cold reaction vessel 12 filled with reaction cake was discharged. The reaction material was treated as in Example 1.

In the Examples 4 to 6, in contrast to the Examples 1 to 3, only the molar mixing ratio of potassium tantalum fluoride and alkali metal was changed, and in addition other alkali metals than potassium chloride were used. The general procedure of Example 1 was repeated. The essential values are shown in Tables 1 to 3, the differences being described below.

EXAMPLE 4

The reaction was carried out in the apparatus of Example 2. Activated potassium tantalum fluoride, potassium chloride, and sodium were mixed in a molar ratio of 1:1.5:5.15. The cooled paste had an ignition point of 156° C. The tantalum powder, which was obtained in a yield of 97.9%, had a grain size according to Fischer of 1.3 my with a bulk weight of 16.1 g./cu. inch=0.98 g./cc.

EXAMPLE 5

With the same arrangement as in Example 2, activated potassium tantalum fluoride was mixed with sodium fluoride and sodium in a molar ratio of 1:2.0:5.09. Result: yield: 95.2%, grain size according to Fisher 1.1 my, bulk weight 14.9 g./cu. in.=0.91 g./cc. By greater dilution with sodium fluoride, the ignition point rose to 159° C.

EXAMPLE 6

The same apparatus as in Example 1 was used. The mixing ratio of activated potassium tantalum fluoride to potassium fluoride to sodium was 1:1.5:4.75 moles. Because of the sodium deficit, the yield dropped to 92.3%. But the treatment with ethanol, after the boats were discharged from the furnace, was omitted, because there was no alkali metal in the reaction material. The ignition point of the paste was 154° C. The tantalum powder had a grain size according to Fisher of 1.4 my, and a bulk weight of 17 g./cu. in.=1.04 g./cc.

EXAMPLE 7

The test arrangement was the same as in Example 1. For the production of the paste, potassium tantalum fluoride, potassium chloride, and sodium were mixed in a molar ratio of 1:1.5:5.5. The ignition point of the paste was at 153° C. Result: yield 98.2%, grain size according to Fisher 1.3 my, bulk weight 16.8 g./cu. in.=1.03 g./cc.

EXAMPLE 8

In order to illustrate the advantage of the process according to the invention, there was used in this example, instead of activated potassium tantalum fluoride, ordinary crystalline commercial potassium tantalum fluoride mixed with potassium chloride and sodium in the molar ratio of 1:1:5.0. The reaction vessel was heated in an oil bath above the melting point of sodium. A stirrer was passed gas-tight through the cover of the reaction vessel, and the mixture was agitated until the potassium tantalum fluoride was surrounded by sodium. Shortly before the mixture solidified, the stirrer was removed from the reaction vessel. Then the mixture was ignited in the reaction vessel. The ignition point was at 268° C. The peak temperature in the reaction vessel obtained by the released energy was 1,080° C. After further treatment as described above, a tantalum powder was obtained of grain size 4.4 my with a 76.3% yield. The bulk weight was 45.2 g./cu. in.=2.76 g./cc.

EXAMPLE 9

Because of the low yield, Example 8 was repeated, and after the ignition and reaction of the mixture, a temperature of 1000° C. was maintained for four hours by additional external heating. After the above-described treatment of the residue, the yield was 86.9%.

EXAMPLE 10

The procedure of Example 8 was repeated, but instead of commercial crystalline potassium tantalum fluoride, a potassium tantalum fluoride was used that had been ground to below 75 my in order to show that the results obtained with normally crushed potassium tantalum fluoride are far inferior to those obtained with activated potassium tantalum fluoride according to the invention. The mixing ratio of ground $K_2TaF_7$ under 75 my to potassium chloride and sodium was, as in Example 7, 1:1:5.0. Compared to crystalline potassium tantalum fluoride, the ignition point dropped from 268° to 248° C.

The test results obtained with the tantalum metal powders according to the examples are compiled in Tables 1 and 2.

Table 1 contains the grain sizes according to Fisher and the grain size distributions; Table 2 shows the electrical test values. These were determined as follows:

(a) To provide equal test conditions, only the fractions under 500 my were used for the electrical test of the tantalum powders.

(b) The powders were compressed in a commercial press without binder. The anode weight was 0.4 g. throughout. The anode diameter was 4.9 mm. As pressing density was used the density at which the pressed anode withstood a fall on a tantalum plate of 2 cm. thickness without damage.

(c) The compacts were sintered in a high vacuum of less than $10^{-5}$ Torr at 1,600° C. (corr.) for 30 minutes. Subsequently the sintered anodes were formed in a forming bath at 90° ±2° C. at 100 volts. The electrolyte was 0.01% phosphoric acid.

The forming current was 35 m A/g. After a forming period of two hours, the anode was washed, dried and tested under the following test conditions:

| Capacitance measurement | |
| --- | --- |
| Electrolyte | 10% $H_3PO_4$ |
| Temperature | 23° ± 3° C. |
| d-c bias | 2.0 volts |
| a-c signal | 0.5 volts |
| Frequency: | 110 Hertz |
| Residual current measurement | |
| Electrolyte | 10% $H_3PO_4$ |
| Temperature | 23° ± 2° C. |
| Test voltage | 70 v. - duration 2 min. after application of test voltage. |
| Breakdown voltage measurement: | |
| Electrolyte | 1% $H_3PO_4$ |
| Temperature | 90° C. ± 2° C. |
| Current | 35 m A/g. (This current is kept constant; the voltage increase results from the rising temperature.) |

The tantalum powders prepared according to the invention of Examples 1 to 6 are suitable according to the test results for the production of dry electrolytic capacitors, with a maximum working voltage of 20 v. In order to be able to use these powders for capacitors with a higher working voltage, they were treated in an argon plasma flame. The improvements in the properties achieved by this after-treatment can be seen from Table 3.

TABLE 1

Average grain size according to Fisher (FSS value) in μm and grain size distribution of tantalum powders in % by weight of Examples 1 to 10.

| Example no.: | 1 | 2 | 3 | 4 | 5 | 6 | 7 | 8 | 10 |
| --- | --- | --- | --- | --- | --- | --- | --- | --- | --- |
| Under 45 μm | 78.9 | 52.5 | 70.5 | 80.3 | 85.1 | 78.8 | 79.9 | 55.8 | 43.4 | 60.1 |
| 45–80 μm | 12.5 | 4.2 | 8.1 | 13.7 | 12.3 | 12.7 | 13.2 | 6.1 | 12.0 | 8.5 |
| 80–120 μm | 4.1 | 15.7 | 5.0 | 3.9 | 1.7 | 3.9 | 4.6 | 13.3 | 11.5 | 11.3 |
| 120–200 μm | 8.0 | 17.1 | 13.2 | 1.3 | 0.9 | 3.1 | 2.2 | 11.0 | 12.6 | 9.0 |
| 200–500 μm | 1.5 | 4.6 | 3.2 | 0.8 | — | 1.5 | 0 1 | 9.5 | 13.3 | 8.1 |
| Over 500 μm | — | 5.9 | — | — | — | — | — | 4.3 | 7.2 | 3.0 |
| FSS value | 1.4 | 3.4 | 1.8 | 1.3 | 1.1 | 1.4 | 1.3 | 4.4 | 5.2 | 3.1 |

TABLE 2

Most important test data and test results of Examples 1 to 10

| Ex. No. | Mols $K_2TaF_7$ | Mols Alkali Metal Halide | Mols Alkali Metal | Ignition Temp. °C. | Yield (% of Input) | FSS-Value (μm*) | Bulk density (scott g./in.³)** | Green Density of Anodes g/cc | Wt. of Test Anodes, g. | μC/g. Capacity*** | Residual current μA/g.**** | Residual current $10^{-4}$ $\frac{\mu A}{\mu C}$ ***** | Breakdown Voltage |
| --- | --- | --- | --- | --- | --- | --- | --- | --- | --- | --- | --- | --- | --- |
| 1 | 1K₂ | 1.3 KCl | 5.09 Na | 152 | 97.3 | 1.4 | 16.8 | 3.5 | 0.4 | 14000 | 10 | 7.14 | 150 |
| 2 | 1K₂ | 1.3 KCl | 5.09 Na | 152 | 93.1 | 3.4 | 32.4 | 5,4 | 0.4 | 7860 | 7.2 | 9.16 | 161 |
| 3 | 1K₂ | 0.75 KCl | 5 Na | 149 | 96.8 | 1.8 | 22.3 | 3,8 | 0.4 | 12000 | 8 | 6.67 | 158 |
| 4 | 1K₂ | 1.5 KCl | 5.15 Na | 156 | 97.9 | 1.3 | 16.1 | 3,4 | 0.4 | 15400 | 6.3 | 4.09 | 155 |
| 5 | 1K₂ | 2 NaF | 5.09 Na | 159 | 95.2 | 1.1 | 14.9 | 3,3 | 0.4 | 16000 | 22 | 13.8 | 154 |
| 6 | 1K₂ | 1.5 KF | 4.75 Na | 154 | 92.3 | 1.4 | 17.0 | 3,6 | 0.4 | 14900 | 9 | 6.04 | 175 |
| 7 | 1K₂ | 1.5 KCl | 5.5 Na | 153 | 98.2 | 1.3 | 16.8 | 3,5 | 0.4 | 15520 | 12 | 7.73 | 153 |
| 8 | 1K₂ | 1.0 KCl | 5 Na | 268 | 76.3 | 4.4 | 45.2 | 6,1 | 0.4 | 7250 | 6.9 | 5.12 | 171 |
| 9 | 1K₂ | 1 KCl | 5 Na | 268 | 86.9 | 5.2 | 51.5 | 6,3 | 0.4 | 6580 | 5.3 | 8.05 | 168 |

TABLE 2-continued

Most important test data and test results of Examples 1 to 10

| Ex. No. | Mols K$_2$TaF$_7$ | Mols Alkali Metal Halide | Mols Alkali Metal | Ignition Temp. °C. | Yield (% of Input) | FSS-Value ($\mu$m*) | Bulk density (scott g./in.$^3$)** | Green Density of Anodes g/cc | Wt. of Test Anodes, g. | $\mu$C/g. Capacity*** | Residual current $\mu$A/g.**** | Residual current $10^{-4} \cdot \frac{\mu A}{\mu C}$ ***** | Breakdown Voltage |
|---|---|---|---|---|---|---|---|---|---|---|---|---|---|
| 10 | 1K$_2$ | 1 KCl | 5 Na | 248 | 78.0 | 3.1 | 30.1 | 5,2 | 0.4 | 7920 | 13.8 | 17.4 | 160 |

*Average grain size according to ASTM B 330-65 (approved 1970), Fisher subsieve sizer
**Bulb density determined according to ASTM B329-70 with Scott volumeter
***Capacitance of test anodes in $\mu$ coulomb per g. of anode weight
****Residual current in $\mu$ ampere per g of anode weight
*****Residual current in $\mu$ A per $\mu$ coulomb volt; the value is obtained from the residual current in $\mu$ A/g and the capacitance $\mu$ C/g.

TABLE 3

Properties of the tantalum powders of Examples 1 to 6 treated in argon plasma.

Test results of Ta powders 1 10 6 from Table 2 after plasma treatment

| Example | 1 | 2 | 3 | 4 | 5 | 6 | 7 | 8 |
|---|---|---|---|---|---|---|---|---|
| 1 | 3.2 | 22 | 3.6 | 0.4 | 12000 | 3.00 | 2.50 | 188 |
| 2 | 4.3 | 27 | 3.6 | 0.4 | 10000 | 2.50 | 2.50 | 192 |
| 3 | 3.0 | 20 | 3.4 | 0.4 | 12500 | 3.20 | 2.56 | 190 |
| 4 | 2.5 | 18 | 3.5 | 0.4 | 13800 | 5.40 | 3.91 | 194 |
| 5 | 3.3 | 23 | 3.6 | 0.4 | 12200 | 2.80 | 2.30 | 202 |
| 6 | 3.1 | 24 | 3.7 | 0.4 | 12400 | 3.00 | 2.42 | 187 |

1 - FSS value in $\mu$m;
2 - density after Scott;
3 - green density of the anodes;
4 - weight of test anodes;
5 - capccitance in $\mu$C/g;
6 - residual current in $\mu$A/g;
7 - residual current in $10^{-4} \cdot \frac{\mu A}{\mu CV}$,
8 - breakdown voltage.

Discussion of the Examples

Examples 1, 3, 4, 5, 6 and 7 illustrate the preparation of high capacitative tantalum powders according to the present invention. They show that the properties of the tantalum powders can be influenced by varying the molar mixing ratio of activated potassium tantalum halide powder, alkali halide and alkali metal, without impairing the advantages of the process according to the invention.

But if tantalum powder is prepared according to the conventional methods, that is, if either the reaction mixture is reacted in larger charges or if the reaction is carried out in the molten state, or if no activated potassium tantalum fluoride is used, the mechanical and electrical properties of the tantalum powders obtained are much inferior, as can be seen from Examples 2, 8, 9 and 10.

In contrast to the process of the present invention, and in order to illustrate the special behavior of activated potassium tantalum fluoride, we used in Examples 8, 9 and 10 commercial crystalline or ground potassium tantalum fluoride. In none of these examples was it possible to obtain a complete reaction of the reaction cake after a punctiform ignition.

EXAMPLE 11

A set-up as described in Example 2 was used. Activated potassium fluo-niobate (K$_2$NbF$_7$), potassium chloride and sodium were blended in a molar ratio of 1:1.8:5.3. After cool down the paste exhibited an ignition temperature of 159° C. The reaction yield was 94.3%. The niobium metal powder averaged 1.2 my particle size according to Fisher. The bulk density was determined as 11 g/inch$^3$ corresponding to 0.67 g/cm$^3$. The particle size distribution was found to be:

| less than 45 my | 82.3% by weight |
|---|---|
| 45–80 my | 4.9% by weight |
| 80–120 my | 8.4% by weight |
| 120–200 my | 3.1% by weight |
| 200–500 my | 1.3% by weight |

This powder was pressed to form anodes of 1.6 g having a diameter of 6.6 mm and a green density of 3 g/cm$^3$. The green anodes were heated to sinter in a hard vacuum of less than $10^{-5}$ Torr at a corrected temperature of 1500° C. Subsequently they were formed with a current of 60 $\mu$A/g at 80 V. in 0.01 percent phosphoric acid (H$_3$PO$_4$) having a temperature of 50±2° C. Forming was finished after two hours. Then the anodes were washed, dried, and tested.

| Test data: | |
|---|---|
| test voltage | 60 V. |
| test temperature | 23 ± 3° C. |
| test electrolyte | 10 percent H$_3$PO$_4$ |
| test frequency | 110 cycles |
| Results: | |
| capacitance | 16 420 my C/g |
| residual current | 28.3 $\mu$A/g |
| breakdown voltage | 125 V. |

After plasma treatment the following data were determined:

| particle size according to Fisher | 4.5 my |
|---|---|
| Scott density | 18 g/inch$^3$ |
| capacitance | 13 600 my C/g |
| residual current | 12 $\mu$A/g |
| breakdown voltage | 143 V. |

We claim:

1. A process for the preparation of a powder of high electrical capacitance of a transition metal of atomic number above 23 of column d3 of the Periodic Chart of Elements, which comprises the steps of:

heating a shallow bed of a powdered alkali metal transition metal halide selected from the group consisting of alkali metal tantalum halide and alkali metal niobium halide in a vacuum and/or under an inert atmosphere thereby removing any water and hydrogen halide present at a temperature of about 325° C. up to the sintering point of said powder to such an extent that said heating decrepitates said alkali metal transition metal halide;

mixing said powder maintained under a dry inert gas with powdered anhydrous alkali metal halide maintained under a dry inert gas and alkali metal maintained under a dry inert gas in 1:0.75–2.0:4.75–5.5 molar ratio at a temperature above the liquefaction point of said metal and below the ignition point of said mixture thereby forming a paste;

forming said paste into shaped masses;

cooling said shaped masses to a temperature below 50° C. and then igniting said shaped masses by contacting said shaped masses at a single point with a glowing external ignitor thereby initiating a reduction reaction and forming elementary tantalum or niobium;

allowing said reaction to go to substantial completion in the absence of external application of heat;

the dimensions of said shaped masses and their temperature at ignition of below 50° C. being predetermined so that the maximum temperature reached by said shaped masses during said reaction is less than about 800° C. and is between about three and five times the ignition temperature of the paste;

cooling said reacted shaped masses;

and pulverizing the reaction product and removing any alkali metal halide and alkali metal present; said steps being performed in an inert atmosphere or under vacuum while any alkali metal is present.

2. A process according to claim 1 wherein the transition metal is tantalum.

3. A process according to claim 2 wherein the alkali metal tantalum halide is decrepitated potassium tantalum fluoride.

4. A process according to claim 2 wherein the alkali metal halide is potassium chloride.

5. A process according to claim 4 wherein said potassium chloride has a particle size finer than 1 mm.

6. Process according to claim 2 wherein the alkali metal is sodium.

7. Process according to claim 2 wherein the alkali metal tantalum halide, the alkali metal halide and the alkali metal are mixed in about 1:1:5 molar ratio.

8. A process according to claim 2 wherein on ignition and during the subsequent reaction the shaped masses are in tantalum boats.

9. Process according to claim 1 wherein the alkali metal is a 50:50 sodium: potassium mixture.

10. A process according to claim 1 wherein the dimensions of the shaped masses and their temperature at ignition are predetermined so that the maximum reaction temperature is in the range of 700° C. to 780° C.

11. A process according to claim 1 wherein the reaction product is crushed to a particle size smaller than about 2 mm.

12. A process according to claim 1 wherein the reaction product is washed with a water soluble alcohol sufficiently long to remove any alkali metal present.

13. A process according to claim 1 wherein the reaction product is extracted with aqueous hydrogen halide solution sufficiently long to remove any alkali metal halide which may be present.

14. A process according to claim 1 wherein the aqueous hydrogen halide solution contains hydrogen peroxide.

15. The process of claim 1 wherein said transition metal is niobium.

16. A process according to claim 1 wherein said heating is carried out at a temperature of 325° C. to 375° C.

17. A continuous process for the manufacture of tantalum metal powder which comprises heating a shallow bed of a powdered alkali metal tantalum halide in a vacuum and/or under an inert atmosphere thereby removing any water and hydrogen halide present at a temperature of about 325° C. up to the sintering point of said powder to such an extent that said heating decrepitates said alkali metal tantalum halide, mixing said powder maintained under a dry inert gas with dry powdered anhydrous alkali metal halide maintained under a dry inert gas and an alkali metal maintained under a dry inert gas in 1:0.75–2.0:4.75–5.5 molar ratio at a temperature above the melting point of said metal and below the ignition point of said mixture thereby forming an extrudable paste, extruding said paste into shaped masses in open containers, the dimension of said shaped masses of paste in said open containers and their temperature at ignition of below 50° C. being predetermined so that the maximum temperature reached by said shaped masses during said reaction is less than about 800° C. and is between about three and five times the ignition temperature of the paste, conveying said shaped masses in open containers therefor through a continuous reaction chamber having an inert atmosphere and a cooling section, an ignition section, a combustion section and another cooling section, cooling said shaped masses in said containers in said cooling section to a temperature below 50° C., igniting said shaped masses in said container in said ignition section by contacting said shaped masses at a single point with a glowing external ignitor, allowing the combustion which occurs to proceed to completion in said combustion section in the absence of external application of heat, cooling said reacted shaped masses in said cooling section to below 50° C., discharging said containers from said reaction chamber, removing the reaction product from said containers, recycling said containers, and removing any alkali metal halide and alkali metal present in said reaction product, said reaction mixture being maintained under an inert atmosphere at least until said reaction is substantially complete.

18. A process according to claim 17 wherein the containers are tantalum.

19. A process according to claim 17 wherein said containers are high-sided vessels adapted to contain a plurality of said cakes.

20. A process according to claim 17 wherein the product discharged from said containers contains alkali metal and said alkali metal is removed by working with a water-soluble alcohol.

21. A process according to claim 17, wherein the product discharged from said containers contains alkali metal halide and said alkali metal halide is removed by washing with dilute aqueous acid.

* * * * *

UNITED STATES PATENT AND TRADEMARK OFFICE
CERTIFICATE OF CORRECTION

PATENT NO. : 4,231,790
DATED : November 4, 1980
INVENTOR(S) : REINHARD HÄHN ET AL.

It is certified that error appears in the above—identified patent and that said Letters Patent is hereby corrected as shown below:

Column 3, line 9: "a electrical" should read -- an electrical --.

line 10" After "powder" please insert a comma -- , --.

line 23: "(fluoride)" should read -- fluoride) --.

Column 11, line 19, Table 3: "Ta powders 1 10 6" should read -- Ta powders 1 to 6 --.

Signed and Sealed this

Seventeenth Day of August 1982

[SEAL]

Attest:

GERALD J. MOSSINGHOFF

Attesting Officer   Commissioner of Patents and Trademarks